(12) United States Patent
Luo

(10) Patent No.: US 11,451,772 B2
(45) Date of Patent: Sep. 20, 2022

(54) INTRA-FRAME PREDICTION CODING METHOD AND APPARATUS, ELECTRONIC DEVICE, AND COMPUTER STORAGE MEDIUM

(71) Applicant: Tencent Technology (Shenzhen) Company Limited, Guangdong (CN)

(72) Inventor: Yonglin Luo, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/319,465

(22) Filed: May 13, 2021

(65) Prior Publication Data
US 2021/0266534 A1 Aug. 26, 2021

Related U.S. Application Data

(63) Continuation of application No. PCT/CN2020/078147, filed on Mar. 6, 2020.

(30) Foreign Application Priority Data

Apr. 11, 2019 (CN) .......................... 201910290936.5

(51) Int. Cl.
*H04N 19/11* (2014.01)
*H04N 19/147* (2014.01)
(Continued)

(52) U.S. Cl.
CPC .......... *H04N 19/11* (2014.11); *H04N 19/147* (2014.11); *H04N 19/159* (2014.11); *H04N 19/176* (2014.11)

(58) Field of Classification Search
CPC .... H04N 19/11; H04N 19/147; H04N 19/159; H04N 19/176; H04N 19/593
See application file for complete search history.

(56) References Cited

U.S. PATENT DOCUMENTS

| 2011/0090960 A1* | 4/2011 | Leontaris | H04N 19/194 375/240.18 |
| 2013/0114716 A1* | 5/2013 | Gao | H04N 19/182 375/240.14 |

(Continued)

FOREIGN PATENT DOCUMENTS

| CN | 102665474 A | 9/2012 | |
| CN | 102685474 A | * 9/2012 | ............. H04N 19/11 |

(Continued)

OTHER PUBLICATIONS

On, Joint Collaborative Team on Video Coding (JCT-VC) of ITU-T SG16 WP3 and ISO/IEC JTC1/SC29/WGLI1 4th Meeting: Daegu, KR, Jan. 20-28, 2011, [JCTVC-D283], JCTVC-D283 (version 3), ITU-T, Jan. 22, 2011, (Year: 2011).*

(Continued)

*Primary Examiner* — Dramos Kalapodas
(74) *Attorney, Agent, or Firm* — ArentFox Schiff LLP

(57) ABSTRACT

An intra-frame prediction coding method includes determining N candidate intra-frame prediction modes for a current coding block, and saving the N candidate intra-frame prediction modes to a candidate mode list, N being a positive integer. The method also includes obtaining, by processing circuitry of a coder, optimal coding modes respectively corresponding to spatially neighboring coding blocks and an upper-layer coding block of the current coding block, and saving the optimal coding modes respectively corresponding to the spatially neighboring coding blocks and the upper-layer coding block to a neighboring mode list. The method further includes determining an optimal coding mode for the current coding block based on the candidate mode list and the neighboring mode list.

18 Claims, 5 Drawing Sheets

(51) Int. Cl.
*H04N 19/159* (2014.01)
*H04N 19/176* (2014.01)

(56) References Cited

U.S. PATENT DOCUMENTS

| | | | | |
|---|---|---|---|---|
| 2013/0128966 A1* | 5/2013 | Gao | .................. | H04N 19/157 375/240.12 |
| 2016/0127725 A1* | 5/2016 | Jamali | ................ | H04N 19/147 375/240.12 |
| 2018/0324418 A1 | 11/2018 | Koo et al. | | |
| 2021/0281836 A1* | 9/2021 | Zhang | ................ | H04N 19/463 |
| 2021/0392373 A1* | 12/2021 | Wang | ................ | H04N 19/157 |

FOREIGN PATENT DOCUMENTS

| | | | | | |
|---|---|---|---|---|---|
| CN | 103997646 A | * | 8/2014 | | |
| CN | 103997646 A | | 8/2014 | | |
| CN | 109889627 A | | 6/2019 | | |
| EP | 3761646 A1 | * | 1/2021 | ............ | H04N 19/11 |
| EP | 3817383 A1 | * | 5/2021 | ........... | H04N 19/105 |
| WO | WO 2018124643 A1 | | 7/2018 | | |
| WO | WO-2018124843 A1 | * | 7/2018 | ........... | H04N 19/103 |
| WO | WO-2020173399 A1 | * | 9/2020 | ............ | H04N 19/11 |

OTHER PUBLICATIONS

International Search Report and Written Opinion dated May 27, 2020 in International Application No. PCT/CN2020/078147, with English translation, citing documents AA and AO-AR therein, 9 pgs.
Chinese Office Action dated Aug. 10, 2020 in Chinese Application No. 201910290936.5, with English translation, citing documents AO-AP therein, 7 pgs.
Japanese Office Action dated Aug. 2, 2022 in Application No. 2021-529273 with English Translation, pp. 1-22.
Zhao, Liang et al., Further Encoder Improvement of intra mode decision, Joint Collaborative Team on Video Coding (JCT-VC) of ITU-T SG16 WP3 and ISO/IEC JTC1/SC29/WG11 4th Meeting: Daegu, KR, Jan. 20-28, 2011, JCTVC-D283 (version 3), ITU-T, Jan. 22, 2011, pp. 1-4.
Kim, Jaehwan et al., Fast intra mode decision of HEVC based on hierarchical structure, 2011 8th International Conference on Information, Communications & Signal Processing, USA, IEEE, Apr. 2, 2012, pp. 1-4.
Zhang, Dongdong et al., Fast intra mode decision for HEVC based on texture characteristic from RMD and MPM, 2014 IEEE Visual Communications and Image Processing Conference, USA, IEEE, Mar. 2, 2015, pp. 510-513.

* cited by examiner

INTRA-FRAME PREDICTION CODING METHOD AND APPARATUS, ELECTRONIC DEVICE, AND COMPUTER STORAGE MEDIUM

RELATED APPLICATIONS

This application is a continuation of International Application No. PCT/CN2020/078147, filed on Mar. 6, 2020, which claims priority to Chinese Patent Application No. 201910290936.5, entitled "INTRA-FRAME PREDICTION CODING METHOD AND APPARATUS, ELECTRONIC DEVICE, AND COMPUTER STORAGE MEDIUM" and filed on Apr. 11, 2019. The entire disclosures of the prior applications are hereby incorporated by reference in their entirety.

FIELD OF THE TECHNOLOGY

This application relates to the field of video coding technologies, including an intra-frame prediction coding method and apparatus, an electronic device, and a computer storage medium.

BACKGROUND OF THE DISCLOSURE

A plurality of mode decision processes are involved in a coding process using the High Efficiency Video Coding (HEVC) standard. Rate distortion optimization (RDO) is currently an important technology for making video coding decisions in the industry, and can effectively select an optimal coding mode for each stage of video coding, thereby improving the compression efficiency. During coding, a coder attempts to perform coding using every possible mode separately, and calculates rate-distortion costs corresponding to the modes, then selects a mode with a minimum rate-distortion cost as the optimal mode, and finally writes the optimal coding mode to a bit stream. Because the coder needs to attempt to perform coding using every mode and complete all the coding stages, the calculation amount involved in RDO is huge. In particular, the addition of numerous coding modes in the HEVC standard directly leads to an exponential increase of the calculation amount of RDO.

Currently, in both HEVC reference software HM and the famous open-source software x265, intra-frame prediction coding adopts a search strategy with two steps: coarse selection and fine selection. In x265, the coarse selection stage uses a simplified sum of absolute transformed differences (SATD) algorithm to quickly identify the most probable optimal mode; and the fine selection stage uses a fine RDO algorithm to ensure the compression efficiency of intra-frame prediction coding.

However, it is found that some calculations of the rate-distortion optimization cost (RdoCost) at the fine selection stage of x265 are useless; in particular, the probability that a mode at the end of a candidate list will be used as the optimal mode is rather low, and the calculation of the RdoCost of these modes brings very low profits, and reduces the overall coding rate and coding efficiency.

SUMMARY

In an embodiment, an intra-frame prediction coding method includes determining N candidate intra-frame prediction modes for a current coding block, and saving the N candidate intra-frame prediction modes to a candidate mode list, N being a positive integer. The method also includes obtaining, by processing circuitry of a coder, optimal coding modes respectively corresponding to spatially neighboring coding blocks and an upper-layer coding block of the current coding block, and saving the optimal coding modes respectively corresponding to the spatially neighboring coding blocks and the upper-layer coding block to a neighboring mode list. The method further includes determining an optimal coding mode for the current coding block based on the candidate mode list and the neighboring mode list.

In an embodiment, an intra-frame prediction coding apparatus includes processing circuitry configured to determine N candidate intra-frame prediction modes for a current coding block, and save the N candidate intra-frame prediction modes to a candidate mode list, N being a positive integer. The processing circuitry is also configured to obtain optimal coding modes respectively corresponding to spatially neighboring coding blocks and an upper-layer coding block of the current coding block, and save the optimal coding modes respectively corresponding to the spatially neighboring coding blocks and the upper-layer coding block to a neighboring mode list. The processing circuitry is further configured to determine an optimal coding mode for the current coding block based on the candidate mode list and the neighboring mode list.

In an embodiment, a non-transitory computer-readable storage medium stores computer-readable instructions, which, when executed by one or more processors, cause the one or more processors to perform an intra-frame prediction coding method. The method includes determining N candidate intra-frame prediction modes for a current coding block, and saving the N candidate intra-frame prediction modes to a candidate mode list, N being a positive integer. The method also includes obtaining optimal coding modes respectively corresponding to spatially neighboring coding blocks and an upper-layer coding block of the current coding block, and saving the optimal coding modes respectively corresponding to the spatially neighboring coding blocks and the upper-layer coding block to a neighboring mode list. The method further includes determining an optimal coding mode for the current coding block based on the candidate mode list and the neighboring mode list.

BRIEF DESCRIPTION OF THE DRAWINGS

The foregoing and/or additional aspects and advantages of this application will become apparent and comprehensible in the description of embodiments made with reference to the following accompanying drawings.

DETAILED DESCRIPTION

Figure 1:
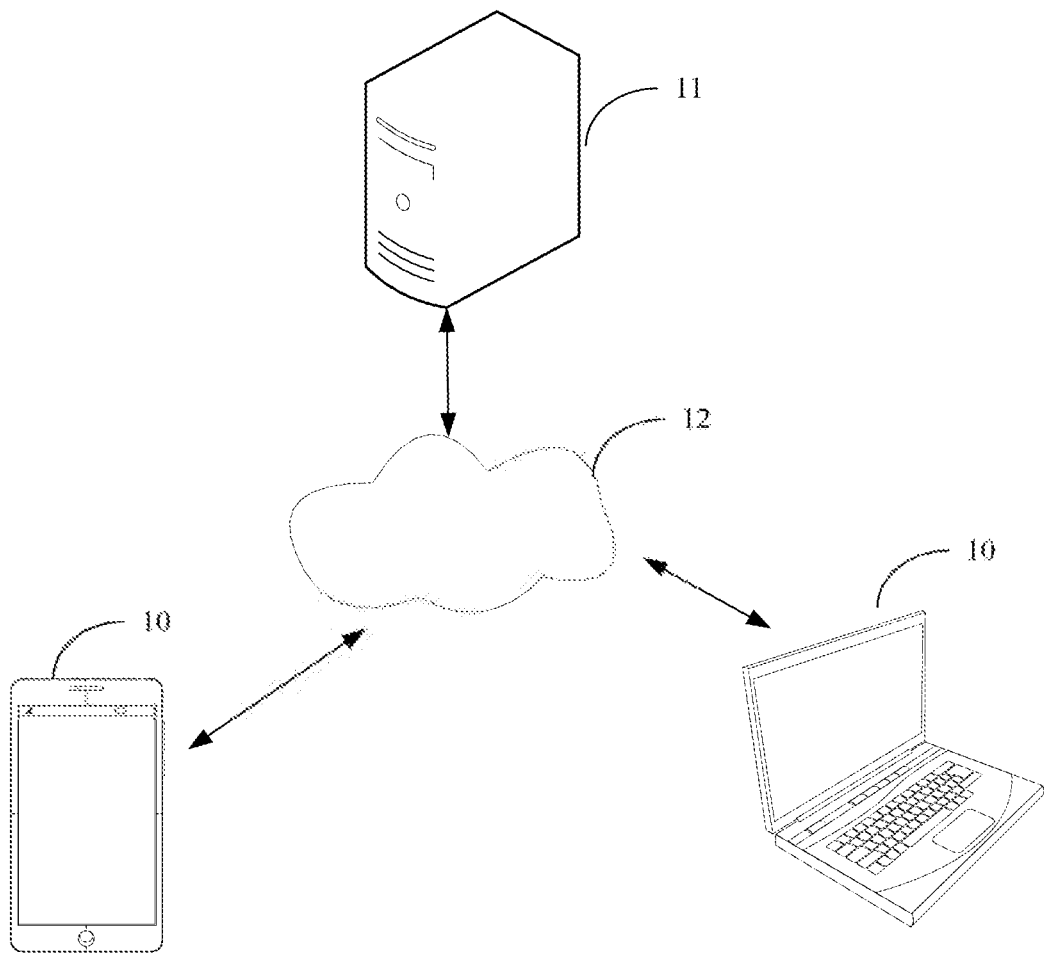
FIG. 1 is a schematic diagram of an application environment of an intra-frame prediction coding method according to an embodiment of this application.

Embodiments of this application are described in detail below, and examples of the embodiments are shown in accompanying drawings, where the same or similar elements or elements having same or similar functions are denoted by the same or similar reference numerals throughout the description. The embodiments that are described below with reference to the accompanying drawings are exemplary, and are only used to interpret this application and cannot be construed as a limitation to this application.

A person skilled in the art may understand that, the singular forms "a", "an", "said", and "the" used herein may include the plural forms as well, unless the context clearly indicates otherwise. It is to be further understood that, the terms "include" and/or "comprise" used in this specification of this application refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of and all combinations of one or more related listed items.

To make objectives, technical solutions, and advantages of this application clearer, the following further describes implementations of this application in detail with reference to the accompanying drawings.

The following describes the technical solutions of this application and how to resolve the foregoing technical issues according to the technical solutions of this application in detail by using specific embodiments. The following several exemplary embodiments may be combined with each other, and the same or similar concepts or processes may not be described repeatedly in some embodiments. The following describes the embodiments of this application with reference to the accompanying drawings.

FIG. 1 is a schematic diagram of an application environment of an intra-frame prediction coding method according to an embodiment of this application. As shown in FIG. 1, a communication system 100 includes one or more terminal devices 10 or a server 11. The terminal device 10 and the server 11 are connected through a network 12, for example, through a wired or a wireless network connection, and is configured to perform the intra-frame prediction coding method according to an embodiment of this application.

In an embodiment shown in FIG. 1, the terminal device 10 may code a coding block in a data frame, and transmit the coded data frame to the server 11 or another device through the network 12, or decode a coded data frame received from the server 11 or another device. The terminal device 10 may be a mobile phone, a tablet computer, a notebook computer, a personal computer (PC), a smart TV, or the like. The terminal device 10 may be installed with a client. The client may be a video client, a browser client, an instant messaging communication client, or the like. The server 11 may code a coding block in a data frame, and transmit the coded data frame to the terminal device 10 or another device through the network 12, or decode a coded data frame received from the terminal device 10 or another device. The server 11 may be a single server, or a server cluster including a plurality of servers, or a cloud computing platform, or the like.

Figure 2:
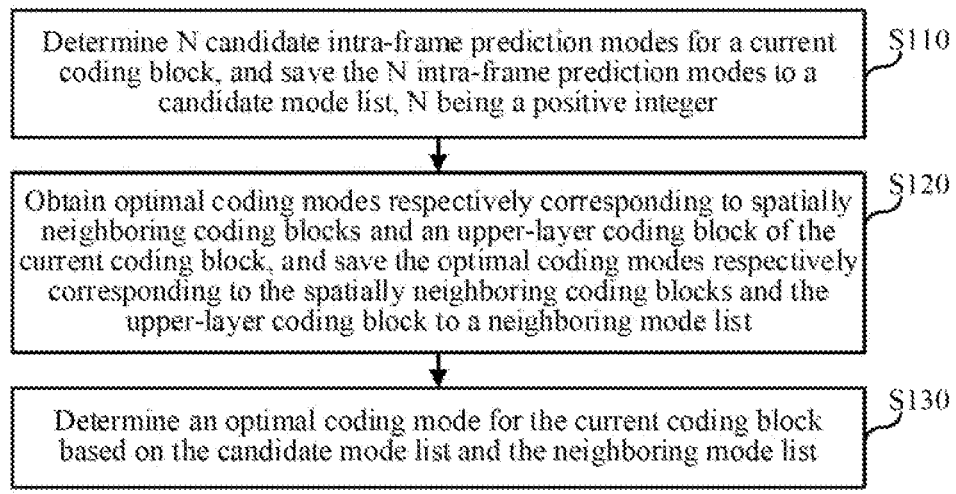
FIG. 2 is a schematic flowchart of an intra-frame prediction coding method according to an embodiment of this application.

An embodiment of this application provides an intra-frame prediction coding method, the method being performed by a coder. The coder may be in a server, or may be in a client, or may be in another possible terminal device, which is not limited in this embodiment of this application. For example, the intra-frame prediction coding method provided in this embodiment of this application is applicable to a terminal device shown in FIG. 1. As shown in FIG. 2, the intra-frame prediction coding method includes the following steps.

In step S110, N candidate intra-frame prediction modes are determined for a current coding block, and the N candidate intra-frame prediction modes are saved to a candidate mode list, N being a positive integer.

In this embodiment of this application, the coder may use a simplified SATD algorithm, to determine N candidate intra-frame prediction modes for a current coding block. After determining the N candidate intra-frame prediction modes, the coder may save the N candidate intra-frame prediction modes to a corresponding list, and for ease of distinguishing subsequently, the list is recorded as a candidate mode list. That is, the coder saves the N candidate intra-frame prediction modes to the candidate mode list, so as to provide the premise and guarantee for determining an optimal coding mode for a current coding block.

In step S120, optimal coding modes respectively corresponding to spatially neighboring coding blocks and an upper-layer coding block of the current coding block are obtained, and the optimal coding modes respectively corresponding to the spatially neighboring coding blocks and the upper-layer coding block are saved to a neighboring mode list.

In this embodiment of this application, after determining the optimal coding modes respectively corresponding to the spatially neighboring coding blocks and the upper-layer coding block of the current coding block, the coder may store the optimal coding modes for the spatially neighboring coding blocks and the optimal coding mode for the upper-layer coding block to a predetermined storage space. In a process of determining the optimal coding mode for the spatially neighboring coding block or the optimal coding mode for the upper-layer coding block, the coder may use the spatially neighboring coding block or the upper-layer coding block as the current coding block, and determine an optimal coding mode for the coding block by using the method according to this embodiment of this application. In this case, the spatially neighboring coding block or the upper-layer coding block is used as the current coding block, and the coder determines an optimal coding mode for the current coding block, so as to determine the optimal coding mode for the spatially neighboring coding block or the upper-layer coding block.

In this embodiment of this application, in response to a determination that the optimal coding mode for the spatially neighboring coding block and the optimal coding mode for the upper-layer coding block need to be utilized in a process of determining the optimal coding mode for the current coding block, the coder may obtain the optimal coding modes respectively corresponding to the spatially neighboring coding blocks and the upper-layer coding block of the current coding block from the predetermined storage space. After the optimal coding modes respectively corresponding to the spatially neighboring coding blocks and the upper-layer coding block are obtained, the optimal coding modes respectively corresponding to the spatially neighboring coding blocks and the upper-layer coding block may be saved to a list, and for ease of distinguishing subsequently, the list is recorded as a neighboring mode list. That is, the optimal coding modes respectively corresponding to the spatially neighboring coding blocks and the upper-layer coding block are saved to the neighboring mode list, so as to provide the premise and guarantee for determining an optimal coding mode for a current coding block.

In step S130, an optimal coding mode for the current coding block is determined based on the candidate mode list and the neighboring mode list.

In this embodiment of this application, after saving the N candidate intra-frame prediction modes to the candidate mode list, and saving the optimal coding modes respectively corresponding to the spatially neighboring coding blocks and the upper-layer coding block to the neighboring mode list, the coder may determine the optimal coding mode for the current coding block based on the candidate mode list and the neighboring mode list. Therefore, the optimal coding modes respectively corresponding to the spatially neighboring coding blocks and the upper-layer coding block of the current coding block are fully utilized, and therefore, the coder adaptively jumps an RDO decision process of some coding modes for the current coding block, thereby reducing the calculation amount of the coder and improving the coding speed and the coding efficiency.

According to the intra-frame prediction coding method provided in this embodiment of this application, by saving a candidate mode list of N candidate intra-frame prediction modes for a current coding block, and saving a neighboring mode list of optimal coding modes respectively corresponding to spatially neighboring coding blocks and an upper-layer coding block of the current coding block, an optimal coding mode for the current coding block is determined. Therefore, the optimal coding modes respectively corresponding to the spatially neighboring coding blocks and the upper-layer coding block of the current coding block can be fully utilized, so as to assist a coder to adaptively jump an RDO decision process of some coding modes for the current coding block, thereby effectively reducing the calculation amount of the coder and greatly improving the coding speed and the coding efficiency.

In a possible implementation, the spatially neighboring coding blocks include at least one of a first coding block adjacent to the current coding block and located at the left side of the current coding block, a second coding block adjacent to the current coding block and located at the upper side of the current coding block, a third coding block adjacent to the first coding block and located at the upper side of the first coding block, a fourth coding block adjacent to the first coding block and located at the lower side of the first coding block, and a fifth coding block adjacent to the second coding block and located at the right side of the second coding block.

Figure 3:
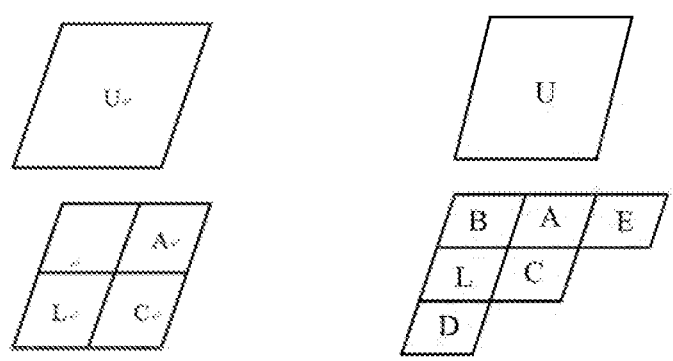
FIG. 3 is a schematic diagram of spatially neighboring coding blocks and an upper-layer coding block according to an embodiment of this application.

In this embodiment of this application, FIG. 3 is a schematic diagram of spatially neighboring coding blocks and an upper-layer coding block. In the schematic diagram at the left side of FIG. 3, C is a current coding block, L is a spatially neighboring coding block of the current coding block C, A is also a spatially neighboring coding block of the current coding block C, U is an upper-layer coding block of the current coding block C in a quad-tree structure, and C is one of submodules of U. L is adjacent to the current coding block C and located at the left side of the current coding block C, and for ease of distinguishing, L is recorded as a first coding block, that is, L is a first coding block adjacent to the current coding block and located at the left side of the current coding block. A is adjacent to the current coding block C and located at the upper side of the current coding block C, and for ease of distinguishing, A is recorded as a second coding block, that is, A is a second coding block adjacent to the current coding block and located at the upper side of the current coding block. Certainly, as shown in the schematic diagram shown at the right side of FIG. 3, the spatially neighboring coding blocks may further include a third coding block, a fourth coding block, and a fifth coding block in addition to the first coding block and the second coding block. In a schematic diagram shown at the right side of FIG. 3, C is the current coding block, L is the first coding block, A is the second coding block, and B is the third coding block adjacent to the first coding block L and located at the upper side of the first coding block L. In other words, B is the third coding block adjacent to the second coding block A and located at the left side of the second coding block A. D is the fourth coding block adjacent to the first coding block L and located at the lower side of the first coding block L. E is the fifth coding block adjacent to the second coding block A and located at the right side of the second coding block A.

An example in which the spatially neighboring coding blocks of the current coding block C include the first coding block L and the second coding block A is used to describe this embodiment of this application in detail.

In this embodiment of this application, the spatially neighboring coding blocks of the current coding block C include the first coding block L and the second coding block A, and therefore, obtaining the optimal coding modes for the spatially neighboring coding blocks of the current coding block is to obtain an optimal coding mode for the first coding block and an optimal coding mode for the second coding block, and obtaining the optimal coding modes respectively corresponding to the spatially neighboring coding blocks and the upper-layer coding block of the current coding block is to obtain the optimal coding mode for the first coding block, the optimal coding mode for the second coding block, and the optimal coding mode for the upper-layer coding block.

In this embodiment of this application, after the optimal coding mode for the first coding block, the optimal coding mode for the second coding block, and the optimal coding mode for the upper-layer coding block are obtained, the optimal coding mode for the first coding block, the optimal coding mode for the second coding block, and the optimal coding mode for the upper-layer coding block may be successively saved to a neighboring mode list according to a predetermined order (which is recorded as a second predetermined order). The second predetermined order may be that: the optimal coding mode for the first coding block is first saved to the neighboring mode list, and then the optimal coding mode for the second coding block is saved to the neighboring mode list, and then the optimal coding mode for the upper-layer coding block is saved to the neighboring mode list. Certainly, the second predetermined order may alternatively be another written order, which is not limited in this embodiment of this application. In other words, the optimal coding mode for the first coding block, the optimal coding mode for the second coding block, and the optimal coding mode for the upper-layer coding block are successively saved to the neighboring mode list according to the second predetermined order.

Figure 4:
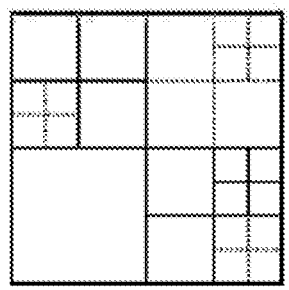
FIG. 4 is a schematic diagram of a quad-tree division of HEVC according to an embodiment of this application.
Figure 4:
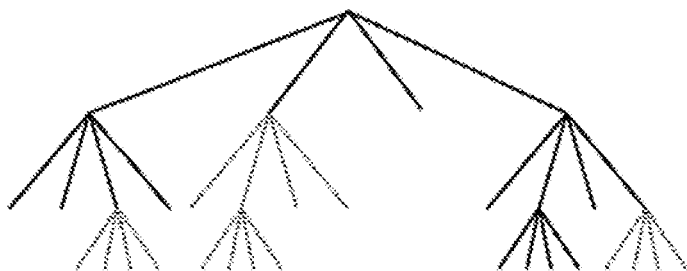

In this embodiment of this application, HEVC adopts a flexible quad-tree coding block division structure, and a largest coding block is a coding tree unit (CTU) with a size being 64×64 pixel. As shown in FIG. 4, the CTU may continue to be recursively divided into smaller coding units (CUs). That is, the CTU may continue to be divided into 4 CUs of 32×32, and each CU of 32×32 may continue to be divided into 4 CUs of 16×16, and the division cannot be stopped until a CU is of 8×8. Therefore, the process of obtaining optimal coding modes respectively corresponding to spatially neighboring coding blocks and an upper-layer coding block of the current coding block includes the following cases.

In case (1), when the current coding block C is located at the leftmost side of an image, there is no other coding block at the left side of the current coding block C. That is, a coding block L adjacent to the current coding block C and located at the left side of the current coding block C exceeds a boundary of the image. In this case, a direct current (DC) mode may be used as an optimal coding mode for the coding block L, that is, in the neighboring mode list, the optimal coding mode for the first coding block is replaced with the DC mode.

In case (2), when the current coding block C is located at the uppermost side of an image, there is no other coding block at the upper side of the current coding block C. That is, a coding block A adjacent to the current coding block C and located at the upper side of the current coding block C exceeds the boundary of the image. In this case, the DC mode may be used as an optimal coding mode for the coding block A, that is, in the neighboring mode list, the optimal coding mode for the second coding block is replaced with the DC mode.

In case (3), if a size of the current coding block C is 32*32 pixels, the current coding block C is the largest intra-frame prediction coding block and has no upper-layer coding blocks in the quad-tree structure. That is, the coding block C is not a sub-coding block of another coding block, and an upper-layer coding block U of the current coding block C in the quad-tree structure exceeds a boundary of the largest intra-frame prediction coding block. In this case, the DC mode may be used as an optimal coding mode for the coding block U, that is, in the neighboring mode list, the optimal coding mode for the upper-layer coding block is replaced with the DC mode.

In case (4), when any one of the first coding block, the second coding block, and the upper-layer coding block does not exceed the boundary of the image, a pre-stored optimal coding mode for a coding block that does not exceed the boundary of the image is obtained.

In other words, the process of obtaining optimal coding modes respectively corresponding to spatially neighboring coding blocks and an upper-layer coding block of the current coding block specifically includes: using, in response to a determination that the first coding block and/or the second coding block exceeds the boundary of the image, the DC mode as an optimal coding mode for a coding block that exceeds the boundary of the image; and using, in response to a determination that the upper-layer coding block exceeds a boundary of the largest intra-frame prediction coding block, the DC mode as the optimal coding mode for the upper-layer coding block. The first coding block and the second coding block may exceed a CTU boundary or a slice boundary, and are not subject to a restriction of video coding standards on obtaining coding information of spatially neighboring coding block.

In another possible implementation, in a process of determining N candidate intra-frame prediction modes for a current coding block, a value of N (that is, a length of a candidate mode list) depends on a size of the current coding block and a rate of distortion level RdLevel set by a user. As shown in Table 1, a value of N increases as a size of the coding block decreases and increases as the RdLevel increases. Therefore, in the process of determining N candidate intra-frame prediction modes for a current coding block, a length N of a candidate mode list of the current coding block needs to be first calculated according to an RdLevel set by a user and a size of the current coding block, the size of the current coding block being known to the coder.

TABLE 1

Values of length N of candidate mode list

| RdLevel | Size of coding block | | | |
|---|---|---|---|---|
| | 32 | 16 | 8 | 4 |
| 1 | 3 | 4 | 4 | 5 |
| 2 | 4 | 5 | 5 | 6 |
| 3 | 5 | 6 | 6 | 7 |
| 4 | 6 | 7 | 7 | 8 |
| 5 | 7 | 8 | 8 | 9 |
| 6 | 8 | 9 | 9 | 10 |

In this embodiment of this application, after the length N of the candidate mode list of the current coding block is calculated, predetermined rate-distortion optimization cost values respectively corresponding to a plurality of predetermined intra-frame prediction modes are then calculated. The predetermined rate-distortion optimization cost value may be a sum of absolute transformed differences cost value (recorded as satdCost), and the predetermined rate-distortion optimization cost value of satdCost is used for ease of a subsequent description. After the predetermined rate-distortion optimization cost values (satdCost) respectively corresponding to the plurality of predetermined intra-frame prediction modes are calculated, the calculated satdCost are sorted according to a first predetermined order, and the N top-ranking intra-frame prediction modes are used as the candidate intra-frame prediction modes for the current coding block, and then the N candidate intra-frame prediction modes are saved to the candidate mode list.

The plurality of predetermined intra-frame prediction modes are 35 intra-frame prediction modes for the HEVC standard, and to calculate satdCost respectively corresponding to a plurality of predetermined intra-frame prediction modes is to calculate satdCost respectively corresponding to the 35 intra-frame prediction modes.

In this embodiment of this application, in the process of calculating satdCost respectively corresponding to a plurality of predetermined intra-frame prediction modes, prediction values of the current coding block may be calculated according to the 35 intra-frame prediction modes respectively, and then sums of absolute transformed differences (satd) and bits respectively corresponding to the intra-frame prediction modes are calculated according to the calculated prediction values respectively corresponding to the intra-frame prediction modes, and then satdCost respectively corresponding to the intra-frame prediction modes are calculated according to the sums of absolute transformed differences (satd) and bits respectively corresponding to the intra-frame prediction modes.

In this embodiment of this application, the first predetermined order may be an ascending order, or may be another sorting order, which is not limited in this embodiment of this application. If the first predetermined order is an ascending order, after satdCost respectively corresponding to the predetermined intra-frame prediction modes are calculated, satdCost may be sorted in an ascending order. Then, the N top-ranking intra-frame prediction modes are used as the candidate intra-frame prediction modes for the current coding block, that is, N intra-frame prediction modes with minimum satdCost are selected as the candidate intra-frame prediction modes for the current coding block from satdCost respectively corresponding to the 35 intra-frame prediction modes, and the intra-frame prediction modes respectively corresponding to N satdCost are saved to the candidate mode list in an ascending order of the N satdCost as the candidate intra-frame prediction modes for the current coding block. In an actual application, the candidate mode list may be recorded as RdoCandList.

In other words, the determining N candidate intra-frame prediction modes for a current coding block in this implementation may be summarized as: sorting satdCost respectively corresponding to a plurality of predetermined intra-frame prediction modes according to a first predetermined order, and using N top-ranking intra-frame prediction modes as the candidate intra-frame prediction modes for the current coding block. The saving the N candidate intra-frame prediction modes to the candidate mode list may be summarized as: successively saving the N candidate intra-frame prediction modes to the candidate mode list according to the first predetermined order.

In another possible implementation, in a process of determining an optimal coding mode for the current coding block based on the candidate mode list and the neighboring mode list, whether a candidate intra-frame prediction mode corresponding to an initial index value or a candidate intra-frame prediction mode corresponding to a second index value in the candidate mode list exists in the neighboring mode list may be determined first. Then, in response to a determination that the candidate intra-frame prediction mode corresponding to the initial index value or the candidate intra-frame prediction mode corresponding to the second index value exists in the neighboring mode list, a value of N is updated to a sum of the initial index value and a first preset value or a sum of the second index value and the first preset value, and the optimal coding mode for the current coding block is determined based on the updated value of N. Then, in response to a determination that neither the candidate intra-frame prediction mode corresponding to the initial index value nor the candidate intra-frame prediction mode corresponding to the second index value exists in the neighboring mode list, the optimal coding mode for the current coding block is determined based on the neighboring mode list.

The first preset value may be 1, or may be set to another value as required, and is not limited in this embodiment of this application. An example in which the first preset value is 1 is used for describing this implementation in detail as follows.

In this embodiment of this application, when the candidate intra-frame prediction mode corresponding to the initial index value in the candidate mode list exists in the neighboring mode list, a value of N is updated. During updating the value of N, in response to a determination that the candidate intra-frame prediction mode corresponding to the initial index value in the candidate mode list exists in the neighboring mode list, a value of N is updated to a sum of the initial index value and 1 (1 is the first preset value). A value of N is updated to a sum of the second index value and 1 (that is, 1 is the first preset value) in response to a determination that the candidate intra-frame prediction mode corresponding to the initial index value in the candidate mode list does not exist in the neighboring mode list and the candidate intra-frame prediction mode corresponding to the second index value exists in the neighboring mode list. After the value of N is updated, the optimal coding mode for the current coding block may be determined based on the updated value of N.

In this embodiment of this application, in the process of determining the optimal coding mode for the current coding block based on the updated value of N, whether the updated value of N is equal to the second preset value may be determined first. Then, the candidate intra-frame prediction mode corresponding to the initial index value in the candidate mode list is determined as the optimal coding mode for the current coding block in response to a determination that the updated value of N is equal to the second preset value. Then, the optimal coding mode for the current coding block is determined according to the candidate mode list and based on the updated value of N in response to a determination that the updated value of N is not equal to the second preset value. The second preset value may be 1, or may be set to another value as required, and is not limited in this embodiment of this application. The second preset value is set to 1 in this embodiment of this application.

In this embodiment of this application, in response to a determination that neither the candidate intra-frame prediction mode corresponding to the initial index value nor the candidate intra-frame prediction mode corresponding to the second index value in the candidate mode list exists in the neighboring mode list, the optimal coding mode for the current coding block is determined based on the neighboring mode list and the candidate mode list.

In the process of determining the optimal coding mode for the current coding block based on the neighboring mode list and the candidate mode list, whether the optimal coding mode corresponding to the initial index value in the neighboring mode list is the same as the optimal coding mode corresponding to the second index value in the neighboring mode list may be determined first. Then, in response to a determination that the optimal coding mode corresponding to the initial index value in the neighboring mode list is the same as the optimal coding mode corresponding to the second index value in the neighboring mode list, a candidate index value (recorded as nIdx) of the optimal coding mode corresponding to the initial index value in the candidate mode list is determined, and the optimal coding mode for the current coding block is determined based on the candidate index value and the candidate mode list. Then, in response to a determination that the optimal coding mode corresponding to the initial index value in the neighboring mode list is different from the optimal coding mode corresponding to the second index value in the neighboring mode list, the optimal coding mode for the current coding block is determined based on the candidate mode list.

In this embodiment of this application, in the process of determining a candidate index value of the optimal coding mode corresponding to the initial index value in the candidate mode list, whether the optimal coding mode corresponding to the initial index value exists in the candidate mode list may be determined first. In response to a determination that the optimal coding mode corresponding to the initial index value exists in the candidate mode list, the candidate index value is determined as an index value of the optimal coding mode corresponding to the initial index value in the candidate mode list. That is, an index value of the optimal coding mode corresponding to the initial index value in the candidate mode list is determined as the candidate index value. In response to a determination that the optimal coding mode corresponding to the initial index value does not exist in the candidate mode list, the candidate index value obtained by subtracting the third predetermined value from the value of N. The third preset value may be 1, or may be set to another value as required, and is not limited in this embodiment of this application. The third preset value is set to 1 in this embodiment of this application, that is, the candidate index value is obtained by subtracting 1 from the value of N (that is, N−1).

In this embodiment of this application, in the process of determining the candidate index value and determining the optimal coding mode for the current coding block based on the candidate index value and the candidate mode list, the value of N may be first updated to a sum of the determined candidate index value (nIdx) and a fourth preset value, and then the optimal coding mode for the current coding block is determined according to the candidate mode list and based on the updated value of N. The fourth preset value may be 1, or may be set to another value as required, and is not limited in this embodiment of this application. The fourth preset value is set to 1 in this embodiment of this application, that is, the value of N is updated to nIdx+1.

In this embodiment of this application, in the process of determining the optimal coding mode for the current coding block according to the candidate mode list, rate-distortion optimization cost values respectively corresponding to the candidate intra-frame prediction modes currently included in the candidate mode list may be determined first; and then a minimum value in the rate-distortion optimization cost values is determined, and a candidate intra-frame prediction mode corresponding to the minimum value is determined as the optimal coding mode for the current coding block.

In the process of determining rate-distortion optimization cost values respectively corresponding to the candidate intra-frame prediction modes currently included in the candidate mode list, a specific calculation process of a rate-distortion optimization cost value for any candidate intra-frame prediction mode may be: determining a predetermined prediction value of the any candidate intra-frame prediction mode first. Then calculating, according to the determined predetermined prediction value, a coding distortion (for example, a square difference and a sum of squared differences (SSD) distortion) of the any candidate intra-frame prediction mode and bits after coding (for example, entropy coding) using the any candidate intra-frame prediction mode. Then calculating a rate-distortion optimization cost value of the any candidate intra-frame prediction mode according to the calculated coding distortion (for example, the SSD distortion) and the bits.

Figure 5:
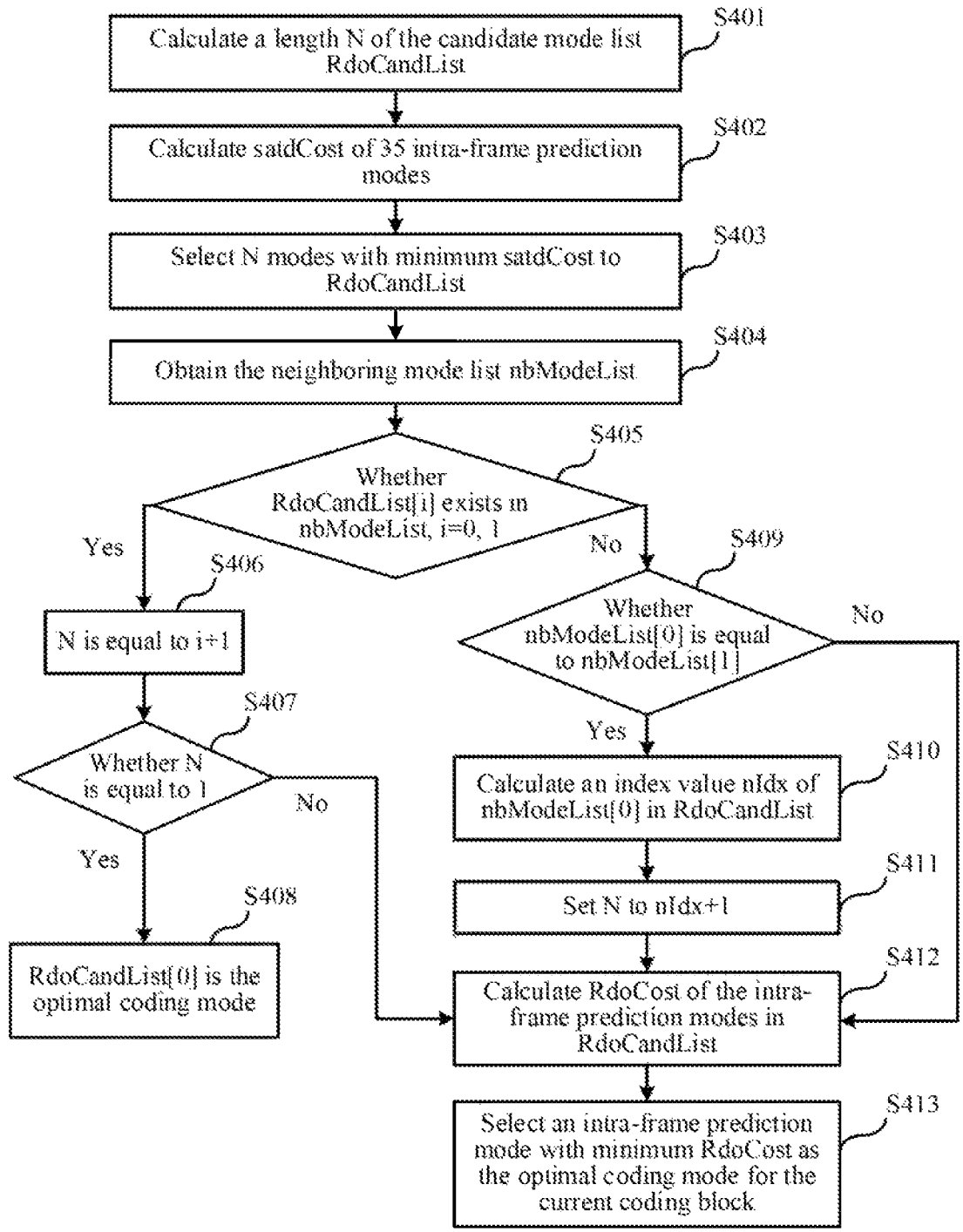
FIG. 5 is a schematic diagram of a process of intra-frame prediction coding according to an embodiment of this application.

FIG. 5 is a schematic diagram of a process of intra-frame prediction coding according to an embodiment of this application. In FIG. 5, neighboring coding blocks include a coding block (that is, the first coding block) at the left of the current coding block and a coding block (that is, the second coding block) above the current coding block. The candidate mode list is recorded as RdoCandList, the neighboring mode list is recorded as nbModeList, the sum of absolute transformed differences cost value is recorded as satdCost, the rate-distortion optimization cost value is recorded as RdoCost, the candidate intra-frame prediction mode corresponding to the initial index value in the candidate mode list is recorded as RdoCandList[0], the candidate intra-frame prediction mode corresponding to the second index value in the candidate mode list is recorded as RdoCandList[1], the candidate intra-frame prediction mode corresponding to the initial index value in the neighboring mode list is recorded as nbModeList[0], and the candidate intra-frame prediction mode corresponding to the second index value in the neighboring mode list is recorded as nbModeList[1]. In addition, for ease of description, values of the first preset value, the second preset value, the third predetermined value, and the fourth preset value are all 1, and the candidate index value is recorded as nIdx.

The procedure shown in FIG. 5 is performed by a coder. The coder may be in a server, or may be in a client, or may be in another possible terminal device, which is not limited in this embodiment of this application. The procedure shown in FIG. 5 may be described as the following steps.

In step S401, a length N of the candidate mode list RdoCandList is calculated. Specifically, the length N of the candidate mode list at a fine selection stage of the current coding block is calculated according to an RdLevel set by a user and a size of the current coding block.

In step S402, satdCost of 35 intra-frame prediction modes is calculated. Specifically, prediction values of the current coding block are calculated by using the 35 intra-frame prediction modes respectively, and a sum of absolute transformed differences (SATD) distortion and estimated bits are calculated, and satdCost is further calculated.

In step S403, N intra-frame prediction modes with minimum satdCost are selected and the N intra-frame prediction modes are saved to RdoCandList. Specifically, N intra-frame prediction modes with minimum satdCost are selected from satdCost of the 35 intra-frame prediction modes, and the candidate intra-frame prediction modes are written into RdoCandList according to corresponding satdCost in an ascending order.

In step S404, the neighboring mode list nbModeList is obtained. Specifically, an optimal coding mode for a coding block at the left of the current coding block, an optimal coding mode for a coding block above the current coding block, and an optimal coding mode for an upper-layer coding block of the current coding block are obtained and are written into nbModeList in an order.

In step S405, a first rapid condition determination is performed. That is, it is determined whether RdoCandList[i] exists in the neighboring mode list nbModeList, and step S406 is performed in response to a determination that RdoCandList[i] exists in nbModeList, and step S409 is performed in response to a determination that RdoCandList[i] does not exist in nbModeList, i=0, 1.

In step S406, N is set to i+1.

In step S407, a second rapid condition determination is performed. That is, it is determined whether N is equal to 1, and step S408 is performed in response to a determination that N is equal to 1, and step S412 is performed in response to a determination that N is not equal to 1.

In step S408, RdoCandList[0] is determined as the optimal coding mode for the current coding block, and the process ends.

In step S409, a third rapid condition determination is performed. That is, it is determined whether nbModeList[0] is equal to nbModeList[1], and step S410 is performed in response to a determination that nbModeList[0] is equal to nbModeList[1], and step S412 is performed in response to a determination that nbModeList[0] is not equal to nbModeList[1].

In step S410, an index value nIdx of nbModeList[0] in RdoCandList is calculated. Specifically, in response to a determination that nbModeList[0] exists in RdoCandList, nIdx is an index value of nbModeList[0] in RdoCandList, and in response to a determination that nbModeList[0] does not exist in RdoCandList, nIdx is set to N−1.

In step S411, N is set to nIdx+1.

In step S412, RdoCost of the candidate intra-frame prediction modes in RdoCandList is calculated. Specifically, prediction values of the current coding block are calculated by using N top-ranking candidate intra-frame prediction modes in RdoCandList respectively, and the coding distortion (for example, the SSD distortion) of the current coding block and bits after the coding (for example, the entropy coding) are respectively calculated according to the calculated prediction values. Then, RdoCost corresponding to the candidate intra-frame prediction modes are respectively calculated according to the calculated coding distortion (for example, the SSD distortion) and the bits after the coding (for example, the entropy coding).

In step S413, a candidate intra-frame prediction mode with minimum RdoCost is selected as the optimal coding mode for the current coding block, and the process ends.

In addition, when the intra-frame prediction coding method according to this embodiment of this application is tested in x265, test data shows that the method may save approximately 30% of coding time on average, which is equivalent to increasing the coding speed by 42%, but the BD-rate is only increased by 0.8%. Obviously, the method basically has no impact on the compression efficiency while significantly reduce the complexity of coding. The test data is shown in Table 2, and test conditions are specifically as shown in the following.

(1) The processor used was as follows: Intel(R) Xeon(R) CPU E5-2670 v3 @2.30 GHz, 48 cores, and internal memory 128 GB.

(2) HEVC standard test sequence was used.

(3) The following x265 configuration was used: full I frame configuration, preset is slow, and fixed quantization parameter (QP).

(4) The following test point was used: QP values are 22, 27, 32, and 37.

TABLE 2

Test data of intra-frame prediction coding method in this embodiment of this application

| standard test sequence category | BD-rate (%) | coding time saved by (%) |
| --- | --- | --- |
| B | 0.8 | −29.94 |
| C | 0.8 | −30.94 |
| D | 0.8 | −29.28 |
| E | 0.9 | −28.97 |
| F | 0.7 | −29.67 |
| All | 0.8 | −29.81 |

Figure 6:
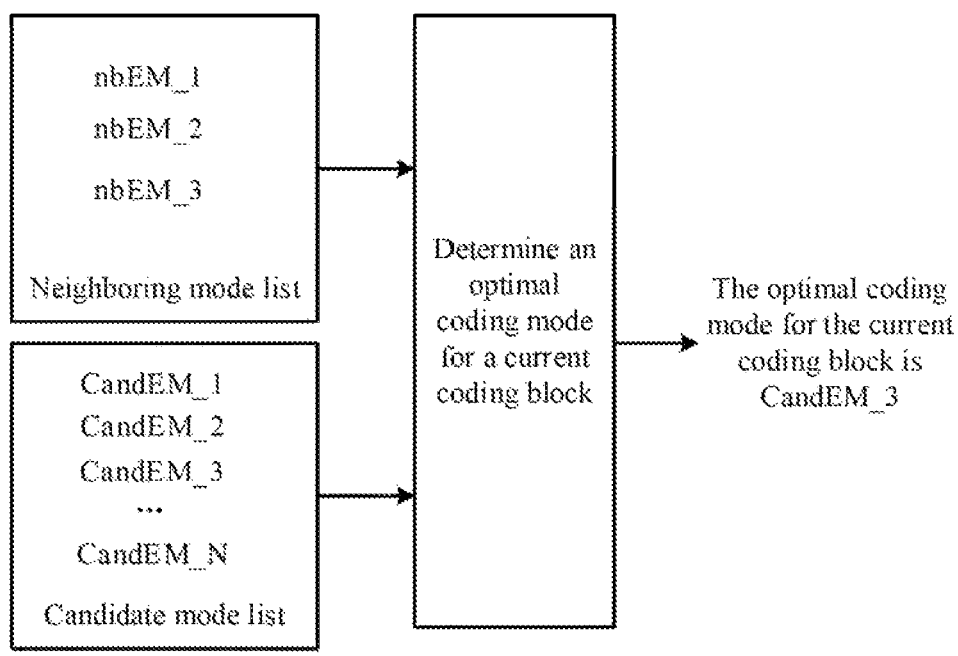
FIG. 6 is a schematic diagram of determining an optimal coding mode for a current coding block by using an intra-frame prediction coding method according to an embodiment of this application.

FIG. 6 is a schematic diagram of determining an optimal coding mode for a current coding block by using an intra-frame prediction coding method according to an embodiment of this application. An example in which the spatially neighboring coding blocks include a coding block (that is, the first coding block) at the left side of the current coding block and a coding block (that is, the second coding block) at the upper side of the current coding block is used for description in FIG. 6, and it is assumed that the first preset value, the second preset value, the third preset value, and the fourth preset value are all 1. In a neighboring mode list shown in FIG. 6, nbEM_1 represents an optimal coding mode for the first coding block, nbEM_2 represents an optimal coding mode for the second coding block, and nbEM_3 represents an optimal coding mode for an upper-layer coding block of the current coding block. In a candidate mode list shown in FIG. 6, CandEM_1 represents an intra-frame prediction mode corresponding to an initial index value in the candidate mode list, CandEM_2 represents an intra-frame prediction mode corresponding to a second index value in the candidate mode list, and by analogy, CandEM_N represents an intra-frame prediction mode corresponding to an Nth index value in the candidate mode list.

In FIG. 6, the process of determining an optimal coding mode for a current coding block is performed by a coder. The coder may be in a server, or may be in a client, or may be in another possible terminal device, which is not limited in this embodiment of this application. The process may specifically be as follows.

First, whether the candidate intra-frame prediction mode corresponding to the initial index value in the candidate mode list or the candidate intra-frame prediction mode corresponding to the second index value in the neighboring mode list exists in the neighboring mode list is determined. A value of N is updated to a sum of the initial index value and 1 in response to a determination that the candidate intra-frame prediction mode corresponding to the initial index value in the candidate mode list exists in the neighboring mode list. Whether the updated value of N is equal to 1 is determined, and the candidate intra-frame prediction mode corresponding to the initial index value is determined as the optimal coding mode for the current coding block in response to a determination that the updated value of N is equal to 1, for example, CandEM_1 is determined as the optimal coding mode for the current coding block. In response to a determination that the updated value of N is not equal to 1, the optimal coding mode for the current coding block is determined according to the candidate mode list and based on the updated value of N, for example, CandEM_3 is determined as the optimal coding mode for the current coding block.

Then, the value of N is updated to a sum of the second index value and 1 in response to a determination that the candidate intra-frame prediction mode corresponding to the initial index value in the candidate mode list does not exist in the neighboring mode list and the candidate intra-frame prediction mode corresponding to the second index value exists in the neighboring mode list. Whether the updated value of N is equal to 1 is determined, and the candidate intra-frame prediction mode corresponding to the second index value is determined as the optimal coding mode for the current coding block in response to a determination that the updated value of N is equal to 1, for example, CandEM_2 is determined as the optimal coding mode for the current coding block. In response to a determination that the updated value of N is not equal to 1, the optimal coding mode for the current coding block is determined according to the candidate mode list and based on the updated value of N, for example, CandEM_3 is determined as the optimal coding mode for the current coding block.

Next, in response to a determination that neither the candidate intra-frame prediction mode corresponding to the initial index value in the candidate mode list nor the candidate intra-frame prediction mode corresponding to the second index value in the candidate mode list exists in the neighboring mode list, the optimal coding mode for the current coding block is determined based on the neighboring mode list and the candidate mode list. The determining the optimal coding mode for the current coding block based on the candidate index value and the candidate mode list specifically include determining whether the optimal coding mode corresponding to the initial index value in the neighboring mode list is the same as the optimal coding mode corresponding to the second index value in the neighboring mode list, and determining a candidate index value (recorded as nIdx) of the optimal coding mode corresponding to the initial index value in the candidate mode list in response to a determination that the optimal coding mode corresponding to the initial index value in the neighboring mode list is the same as the optimal coding mode corresponding to the second index value in the neighboring mode list, and updating a value of N to a sum of the candidate index value and 1 (recorded as N=nIdx+1), and determining the optimal coding mode for the current coding block according to the candidate mode list and based on the updated value of N; and in response to a determination that the optimal coding mode corresponding to the initial index value in the neighboring mode list is different from the optimal coding mode corresponding to the second index value in the neighboring mode list, the optimal coding mode for the current coding block is determined according to the candidate mode list.

In this embodiment of this application, the process of determining a candidate index value of the optimal coding mode corresponding to the initial index value in the candidate mode list may specifically include: determining, in response to a determination that the optimal coding mode corresponding to the initial index value exists in the candidate mode list, the candidate index value as an index value of the optimal coding mode corresponding to the initial index value in the candidate mode list; and subtracting, in response to a determination that the optimal coding mode corresponding to the initial index value does not exist in the candidate mode list, 1 from the value of N to obtain the candidate index value.

In this embodiment of this application, the process of determining the optimal coding mode for the current coding block according to the candidate mode list may specifically include: calculating a rate-distortion optimization cost value (recorded as RdoCost) of the candidate intra-frame prediction modes in the candidate mode list, and selecting a candidate intra-frame prediction mode with minimum Rdo-Cost as a final optimal mode for the current coding block, for example, CandEM_3 is selected as a final optimal mode for the current coding block. The calculating rate-distortion optimization cost value of the candidate intra-frame prediction modes in the candidate mode list may specifically include: calculating prediction values of the current coding block by using N top-ranking candidate intra-frame prediction modes in the candidate mode list respectively, and respectively calculating the coding distortion (for example, the SSD distortion) of the current coding block and bits after the coding (for example, the entropy coding) according to the calculated prediction values, and then, respectively calculating RdoCost corresponding to the candidate intra-frame prediction modes according to the calculated coding distortion (for example, the SSD distortion) and the bits after the coding (for example, the entropy coding).

In this embodiment of this application, the optimal coding modes respectively corresponding to the spatially neighboring coding blocks and the upper-layer coding block of the current coding block are utilized to assist a coder to adaptively omit an RDO decision process of some coding modes for the current coding block, thereby effectively reducing the calculation amount of the coder and greatly improving the coding speed and the coding efficiency.

Figure 7:
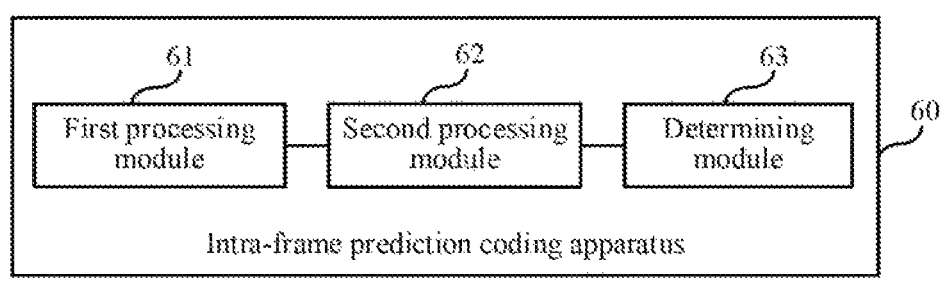
FIG. 7 is a schematic structural diagram of an intra-frame prediction coding apparatus according to an embodiment of this application.

FIG. 7 is a schematic structural diagram of an intra-frame prediction coding apparatus according to an embodiment of this application. As shown in FIG. 7, the apparatus 60 may include: a first processing module 61, a second processing module 62, and a determining module 63. One or more of the modules can be implemented by processing circuitry, software, or a combination thereof, for example. The first processing module 61 is configured to determine N candidate intra-frame prediction modes for a current coding block, and save the N candidate intra-frame prediction modes to a candidate mode list, N being a positive integer. The second processing module 62 is configured to obtain optimal coding modes respectively corresponding to spatially neighboring coding blocks and an upper-layer coding block of the current coding block, and save the optimal coding modes respectively corresponding to the spatially neighboring coding blocks and the upper-layer coding block to a neighboring mode list. The determining module 63 is configured to determine an optimal coding mode for the current coding block based on the candidate mode list and the neighboring mode list.

According to the apparatus provided in this embodiment of this application, by saving a candidate mode list of N candidate intra-frame prediction modes for a current coding block, and saving a neighboring mode list of optimal coding modes respectively corresponding to spatially neighboring coding blocks and an upper-layer coding block of the current coding block, an optimal coding mode for the current coding block is determined. Therefore, the optimal coding modes respectively corresponding to the spatially neighboring coding blocks and the upper-layer coding block of the current coding block can be fully utilized, so as to adaptively jump an RDO decision process of some coding modes for the current coding block, thereby effectively reducing the calculation amount of the coder and greatly improving the coding speed and the coding efficiency.

Figure 8:
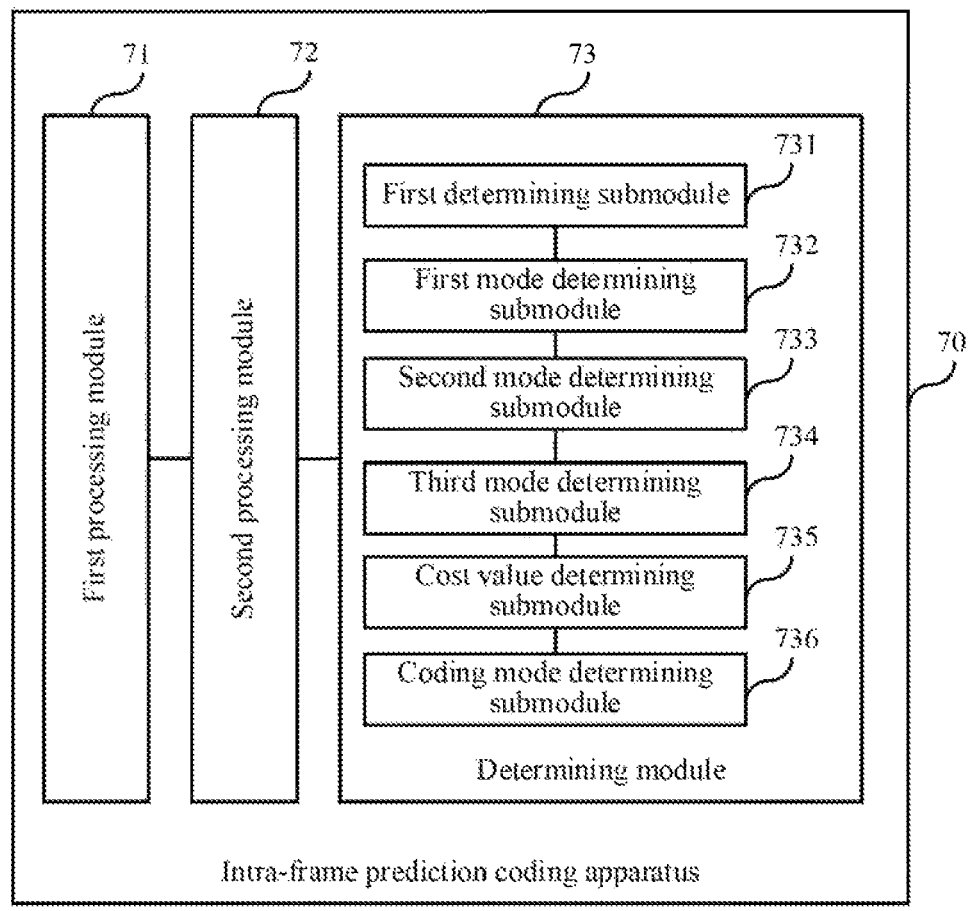
FIG. 8 is a schematic structural diagram of another intra-frame prediction coding apparatus according to an embodiment of this application.

FIG. 8 is a schematic structural diagram of another intra-frame prediction coding apparatus according to an embodiment of this application. As shown in FIG. 8, the apparatus 70 may include: a first processing module 71, a second processing module 72, and a determining module 73. A function implemented by the first processing module 71 in FIG. 8 is the same as that implemented by the first processing module 61 in FIG. 7, a function implemented by the second processing module 72 in FIG. 8 is the same as that implemented by the second processing module 62 in FIG. 7, and a function implemented by the determining module 73 in FIG. 8 is the same as that implemented by the determining module 63 in FIG. 7. Details are not described herein again. The intra-frame prediction coding apparatus shown in FIG. 8 is described in detail in the following.

In this embodiment of this application, the spatially neighboring coding blocks include at least one of a first coding block adjacent to the current coding block and located at the left side of the current coding block, a second coding block adjacent to the current coding block and located at the upper side of the current coding block, a third coding block adjacent to the first coding block and located at the upper side of the first coding block, a fourth coding block adjacent to the first coding block and located at the lower side of the first coding block, and a fifth coding block adjacent to the second coding block and located at the right side of the second coding block.

The second processing module 72 is specifically configured to obtain the optimal coding mode for at least one of the first coding block, the second coding block, the third coding block, the fourth coding block, and the fifth coding block and the optimal coding mode for the upper-layer coding block.

In this embodiment of this application, the first processing module 71 is specifically configured to sort predetermined rate-distortion optimization cost values respectively corresponding to a plurality of predetermined intra-frame prediction modes according to a first predetermined order, and use N top-ranking intra-frame prediction modes as the candidate intra-frame prediction modes for the current coding block; and successively save the N candidate intra-frame prediction modes to the candidate mode list according to the first predetermined order.

The second processing module 72 is specifically configured to successively save the optimal coding mode for at least one of the first coding block, the second coding block, the third coding block, the fourth coding block, and the fifth coding block and the optimal coding mode for the upper-layer coding block to the neighboring mode list according to a second predetermined order.

In this embodiment of this application, the second processing module 72 is specifically configured to obtain, in response to a determination that any one of the first coding block, the second coding block, the third coding block, the fourth coding block, and the fifth coding block does not exceed a boundary of an image, a pre-stored optimal coding mode for each coding block that does not exceed the boundary of the image. The second processing module 72 is also configured to use, in response to a determination that any one of the first coding block, the second coding block, the third coding block, the fourth coding block, and the fifth coding block exceeds the boundary of the image, a DC mode as an optimal coding mode for each coding block that exceeds the boundary of the image. The second processing module 72 is further configured to obtain, in response to a determination that the upper-layer coding block does not exceed the boundary of the image, a pre-stored optimal coding mode for the upper-layer coding block. The second processing module 72 is also configured to use, in response to a determination that the upper-layer coding block exceeds a boundary of a largest intra-frame prediction coding block, the DC mode as the optimal coding mode for the upper-layer coding block.

In this embodiment of this application, the determining module 73 includes a first determining submodule 731, a first mode determining submodule 732, a second mode determining submodule 733, and a third mode determining submodule 734. One or more of the submodules can be implemented by processing circuitry, software, or a combination thereof, for example. The first determining submodule 731 is configured to determine whether a candidate intra-frame prediction mode corresponding to an initial index value in the candidate mode list or a candidate intra-frame prediction mode corresponding to a second index value in the candidate mode list exists in the neighboring mode list. The first mode determining submodule 732 is configured to update, in response to a determination that the candidate intra-frame prediction mode corresponding to the initial index value in the candidate mode list exists in the neighboring mode list, a value of N to a sum of the initial index value and a first preset value, and determine the optimal coding mode for the current coding block based on the updated value of N. The second mode determining submodule 733 is configured to update, in response to a determination that the candidate intra-frame prediction mode corresponding to the initial index value in the candidate mode list does not exist in the neighboring mode list and the candidate intra-frame prediction mode corresponding to the second index value in the candidate mode list exists in the neighboring mode list, a value of N to a sum of the second index value and a first preset value, and determine the optimal coding mode for the current coding block based on the updated value of N. The third mode determining submodule 734 is configured to determine, in response to a determination that neither the candidate intra-frame prediction mode corresponding to the initial index value nor the candidate intra-frame prediction mode corresponding to the second index value exists in the neighboring mode list, the optimal coding mode for the current coding block based on the neighboring mode list and the candidate mode list.

In this embodiment of this application, the first mode determining submodule 732 is specifically configured to determine, in response to a determination that the updated value of N is equal to a second preset value, the candidate intra-frame prediction mode corresponding to the initial index value as the optimal coding mode for the current coding block; and determine, in response to a determination that the updated value of N is not equal to the second preset value, the optimal coding mode for the current coding block according to the candidate mode list and based on the updated value of N.

In this embodiment of this application, the second mode determining submodule 733 is specifically configured to determine, in response to a determination that an optimal coding mode corresponding to an initial index value in the neighboring mode list is the same as an optimal coding mode corresponding to a second index value in the neighboring mode list, a candidate index value of the optimal coding mode corresponding to the initial index value in the candidate mode list, and determine the optimal coding mode for the current coding block based on the candidate index value and the candidate mode list; and determine, in response to a determination that the optimal coding mode corresponding to the initial index value in the neighboring mode list is different from the optimal coding mode corresponding to the second index value in the neighboring mode list, the optimal coding mode for the current coding block based on the candidate mode list.

In this embodiment of this application, the second mode determining submodule 733 is specifically configured to use, in response to a determination that the optimal coding mode corresponding to the initial index value exists in the candidate mode list, an index value of the optimal coding mode corresponding to the initial index value in the candidate mode list as the candidate index value; and subtract, in response to a determination that the optimal coding mode corresponding to the initial index value does not exist in the candidate mode list, a third preset value from the value of N to obtain the candidate index value.

In this embodiment of this application, the second mode determining submodule 733 is specifically configured to update a value of N to a sum of the candidate index value and a fourth preset value, and determine the optimal coding mode for the current coding block according to the candidate mode list and based on the updated value of N.

In this embodiment of this application, the determining module 73 includes a cost value determining submodule 735 and a coding mode determining submodule 736. One or more of the submodules can be implemented by processing circuitry, software, or a combination thereof, for example. The cost value determining submodule 735 is configured to determine rate-distortion optimization cost values respectively corresponding to the candidate intra-frame prediction modes currently included in the candidate mode list. The coding mode determining submodule 736 is configured to determine a minimum value in the rate-distortion optimization cost values, and use a candidate intra-frame prediction mode corresponding to the minimum value as the optimal coding mode for the current coding block.

In this embodiment of this application, the cost value determining submodule 735 is specifically configured to determine a predetermined prediction value of any candidate intra-frame prediction mode. The cost value determining submodule 735 is also configured to calculate a coding distortion of the any candidate intra-frame prediction mode and bits after coding using the any candidate intra-frame prediction mode according to the predetermined prediction value. The cost value determining submodule 735 is further configured to calculate a rate-distortion optimization cost value of the any candidate intra-frame prediction mode according to the coding distortion and the bits.

Figure 9:
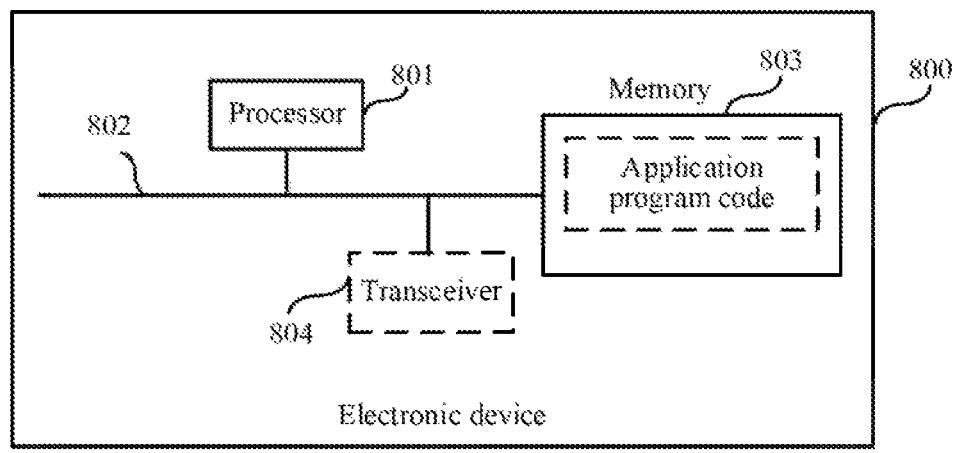
FIG. 9 is a schematic structural diagram of an electronic device according to an embodiment of this application.

As shown in FIG. 9, an embodiment of this application provides an electronic device. An electronic device 800 shown in FIG. 9 includes a processor 801 and a memory 803. The processor 801 and the memory 803 are connected, for example, are connected by using a bus 802. Further, the electronic device 800 may further include a transceiver 804. In an actual application, there may be one or more transceivers 804. The structure of the electronic device 800 does not constitute a limitation on this embodiment of this application.

The processor 801 (or processing circuitry) is applied to this embodiment of this application, to implement functions of the first processing modules, the second processing modules, and the determining modules shown in FIG. 7 and FIG. 8.

The processor 801 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in this application. The processor 801 may alternatively be a combination to implement a computing function, for example, may be a combination of one or more microprocessors, or a combination of a DSP and a microprocessor.

The bus 802 may include a channel, to transmit information between the foregoing components. The bus 802 may be a PCI bus, an EISA bus, or the like. The bus 802 may be classified into an address bus, a data bus, a control bus, and the like. For ease of description, the bus in FIG. 9 is represented by using only one bold line, but this does not indicate that there is only one bus or one type of bus.

The memory 803 may be a ROM or another type of static storage device (non-transitory storage medium) that can store static information and a static instruction. The memory 803 may also be a RAM or another type of dynamic storage device that can store information and an instruction. The memory 803 may further be an EEPROM, a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto.

The memory 803 is configured to store application program codes for performing the solutions of this application, and is controlled and executed by the processor 801. The processor 801 is configured to execute application program codes stored in the memory 803 to implement functions of the intra-frame prediction coding apparatus provided in the embodiment shown in FIG. 7 or FIG. 8.

Another electronic device provided in this embodiment of this application includes a memory and a processor, and the memory stores a computer program executable on the processor, and the processor, when executing the computer program, may implement the intra-frame prediction coding method described in the foregoing embodiments.

An embodiment of this application provides a non-transitory computer-readable storage medium, storing a computer program, the computer program, when executed by one or more processors, implementing the intra-frame prediction coding method described in the foregoing embodiments. By saving a candidate mode list of N candidate intra-frame prediction modes for a current coding block, and saving a neighboring mode list of optimal coding modes respectively corresponding to spatially neighboring coding blocks and an upper-layer coding block of the current coding block, an optimal coding mode for the current coding block is determined. Therefore, the optimal coding modes respectively corresponding to the spatially neighboring coding blocks and the upper-layer coding block of the current coding block can be fully utilized, so as to assist a coder to adaptively jump an RDO decision process of some coding modes for the current coding block, thereby effectively reducing the calculation amount of the coder and greatly improving the coding speed and the coding efficiency.

The computer-readable storage medium provided in this embodiment of this application is applied to any one embodiment of the foregoing method.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of this application. A person of ordinary skill in the art may make several improvements and refinements without departing from the principle of this application, and the improvements and refinements shall fall within the protection scope of this application.

What is claimed is:

1. An intra-frame prediction coding method comprising:
determining N candidate intra-frame prediction modes for a current coding block, and saving the N candidate intra-frame prediction modes to a candidate mode list, N being a positive integer;
obtaining, by processing circuitry of a coder, optimal coding modes respectively corresponding to spatially neighboring coding blocks and an upper-layer coding block of the current coding block, and saving the optimal coding modes respectively corresponding to the spatially neighboring coding blocks and the upper-layer coding block to a neighboring mode list; and determining an optimal coding mode for the current coding block based on the candidate mode list and the neighboring mode list, wherein the spatially neighboring coding blocks comprise at least one of a first coding block adjacent to the current coding block and located at a left side of the current coding block, a second coding block adjacent to the current coding block and located at an upper side of the current coding block, a third coding block adjacent to the first coding block and located at an upper side of the first coding block, a fourth coding block adjacent to the first coding block and located at a lower side of the first coding block, and a fifth coding block adjacent to the second coding block and located at a right side of the second coding block, the determining the N candidate intra-frame prediction modes includes sorting predetermined rate-distortion optimization cost values respectively corresponding to a plurality of predetermined intra-frame prediction modes according to a first predetermined order, and using N top-ranking intra-frame prediction modes as the candidate intra-frame prediction modes for the current coding block, the saving the N candidate intra-frame prediction modes to the candidate mode list includes successively saving the N candidate intra-frame prediction modes to the candidate mode list according to the first predetermined order, and the saving the optimal coding modes respectively corresponding to the spatially neighboring coding blocks and the upper-layer coding block to the neighboring mode list includes successively saving the optimal coding mode for at least one of the first coding block, the second coding block, the third coding block, the fourth coding block, and the fifth coding block and the optimal coding mode for the upper-layer coding block to the neighboring mode list according to a second predetermined order.

2. The method according to claim 1, wherein the obtaining comprises:

obtaining the optimal coding mode for the at least one of the first coding block, the second coding block, the third coding block, the fourth coding block, and the fifth coding block and the optimal coding mode for the upper-layer coding block.

3. The method according to claim 2, wherein the obtaining the optimal coding mode for the at least one of the first coding block, the second coding block, the third coding block, the fourth coding block, and the fifth coding block and the optimal coding mode for the upper-layer coding block comprises:

obtaining, in response to a determination that any one of the first coding block, the second coding block, the third coding block, the fourth coding block, and the fifth coding block does not exceed a boundary of an image, a pre-stored optimal coding mode as the optimal coding mode for each coding block that does not exceed the boundary of the image;

using, in response to a determination that any one of the first coding block, the second coding block, the third coding block, the fourth coding block, and the fifth coding block exceeds the boundary of the image, a direct current (DC) mode as the optimal coding mode for each coding block that exceeds the boundary of the image;

obtaining, in response to a determination that the upper-layer coding block does not exceed the boundary of the image, a pre-stored optimal coding mode as the optimal coding mode for the upper-layer coding block; and using, in response to a determination that the upper-layer coding block exceeds a boundary of a largest intra-frame prediction coding block, the DC mode as the optimal coding mode for the upper-layer coding block.

4. The method according to claim 1, wherein the determining the optimal coding mode for the current coding block based on the candidate mode list and the neighboring mode list comprises:

determining whether a candidate intra-frame prediction mode corresponding to an initial index value in the candidate mode list or a candidate intra-frame prediction mode corresponding to a second index value in the candidate mode list exists in the neighboring mode list;

updating, in response to a determination that the candidate intra-frame prediction mode corresponding to the initial index value in the candidate mode list exists in the neighboring mode list, a value of N to a sum of the initial index value and a first preset value, and determining the optimal coding mode for the current coding block based on the updated value of N;

updating, in response to a determination that the candidate intra-frame prediction mode corresponding to the initial index value in the candidate mode list does not exist in the neighboring mode list and that the candidate intra-frame prediction mode corresponding to the second index value in the candidate mode list exists in the neighboring mode list, the value of N to a sum of the second index value and the first preset value, and determining the optimal coding mode for the current coding block based on the updated value of N; and determining, in response to a determination that neither the candidate intra-frame prediction mode corresponding to the initial index value in the candidate mode list nor the candidate intra-frame prediction mode corresponding to the second index value in the candidate mode list exists in the neighboring mode list, the optimal coding mode for the current coding block based on the neighboring mode list and the candidate mode list.

5. The method according to claim 4, wherein the determining the optimal coding mode for the current coding block based on the updated value of N comprises:

determining, in response to a determination that the updated value of N is equal to a second preset value, the candidate intra-frame prediction mode corresponding to the initial index value as the optimal coding mode for the current coding block; and determining, in response to a determination that the updated value of N is not equal to the second preset value, the optimal coding mode for the current coding block according to the candidate mode list and based on the updated value of N.

6. The method according to claim 4, wherein the determining the optimal coding mode for the current coding block based on the neighboring mode list and the candidate mode list comprises:

determining, in response to a determination that an optimal coding mode corresponding to an initial index value in the neighboring mode list is the same as an optimal coding mode corresponding to a second index value in the neighboring mode list, a candidate index value of the optimal coding mode corresponding to the initial index value in the candidate mode list, and determining the optimal coding mode for the current coding block based on the candidate index value and the candidate mode list; and determining, in response to a determination that the optimal coding mode corresponding to the initial index value in the neighboring mode list is different from the optimal coding mode corresponding to the second index value in the neighboring mode list, the optimal coding mode for the current coding block based on the candidate mode list.

7. The method according to claim 6, wherein the determining the candidate index value of the optimal coding mode corresponding to the initial index value in the candidate mode list comprises:

using, in response to a determination that the optimal coding mode corresponding to the initial index value in the neighboring mode list exists in the candidate mode list, an index value of the optimal coding mode corresponding to the initial index value in the candidate mode list as the candidate index value; and subtracting, in response to a determination that the optimal coding mode corresponding to the initial index value in the neighboring mode list does not exist in the candidate mode list, a third preset value from the value of N to obtain the candidate index value.

8. The method according to claim 7, wherein the determining the optimal coding mode for the current coding block based on the candidate index value and the candidate mode list comprises:

updating the value of N to a sum of the candidate index value and a fourth preset value, and determining the optimal coding mode for the current coding block according to the candidate mode list and based on the updated value of N.

9. The method according to claim 5, wherein the determining the optimal coding mode for the current coding block according to the candidate mode list and based on the updated value of N comprises:

determining rate-distortion optimization cost values respectively corresponding to the candidate intra-frame prediction modes currently included in the candidate mode list, a number of the candidate intra-frame prediction modes currently included in the candidate mode list being equal to the updated value of N; and determining a minimum value among the rate-distortion optimization cost values, and using a candidate intra-frame prediction mode corresponding to the minimum value as the optimal coding mode for the current coding block.

10. The method according to claim 9, wherein the determining the rate-distortion optimization cost values respectively corresponding to the candidate intra-frame prediction modes currently included in the candidate mode list comprises:

determining a predetermined prediction value of each candidate intra-frame prediction mode currently included in the candidate mode list;

calculating a coding distortion of the each candidate intra-frame prediction mode and bits after coding using the each candidate intra-frame prediction mode according to the predetermined prediction value; and calculating a rate-distortion optimization cost value of the each candidate intra-frame prediction mode according to the coding distortion and the bits after coding.

11. An intra-frame prediction coding apparatus, comprising:

processing circuitry configured to determine N candidate intra-frame prediction modes for a current coding block, and save the N candidate intra-frame prediction modes to a candidate mode list, N being a positive integer;

obtain optimal coding modes respectively corresponding to spatially neighboring coding blocks and an upper-layer coding block of the current coding block, and save the optimal coding modes respectively corresponding to the spatially neighboring coding blocks and the upper-layer coding block to a neighboring mode list; and determine an optimal coding mode for the current coding block based on the candidate mode list and the neighboring mode list, wherein the spatially neighboring coding blocks comprise at least one of a first coding block adjacent to the current coding block and located at a left side of the current coding block, a second coding block adjacent to the current coding block and located at an upper side of the current coding block, a third coding block adjacent to the first coding block and located at an upper side of the first coding block, a fourth coding block adjacent to the first coding block and located at a lower side of the first coding block, and a fifth coding block adjacent to the second coding block and located at a right side of the second coding block, to determine the N candidate intra-frame prediction modes, the processing circuitry is configured to sort predetermined rate-distortion optimization cost values respectively corresponding to a plurality of predetermined intra-frame prediction modes according to a first predetermined order, and use N top-ranking intra-frame prediction modes as the candidate intra-frame prediction modes for the current coding block, to save the N candidate intra-frame prediction modes to the candidate mode list, the processing circuitry is configured to successively save the N candidate intra-frame prediction modes to the candidate mode list according to the first predetermined order, and to save the optimal coding modes respectively corresponding to the spatially neighboring coding blocks and the upper-layer coding block to the neighboring mode list, the processing circuitry is configured to successively save the optimal coding mode for the at least one of the first coding block, the second coding block, the third coding block, the fourth coding block, and the fifth coding block and the optimal coding mode for the upper-layer coding block to the neighboring mode list according to a second predetermined order.

12. The apparatus according to claim 11, wherein to obtain the optimal coding modes, the processing circuitry is configured to obtain the optimal coding mode for the at least one of the first coding block, the second coding block, the third coding block, the fourth coding block, and the fifth coding block and the optimal coding mode for the upper-layer coding block.

13. The apparatus according to claim 12, wherein, to obtain the optimal coding mode for the at least one of the first coding block, the second coding block, the third coding block, the fourth coding block, and the fifth coding block and the optimal coding mode for the upper-layer coding block, the processing circuitry is configured to:

obtain, in response to a determination that any one of the first coding block, the second coding block, the third coding block, the fourth coding block, and the fifth coding block does not exceed a boundary of an image, a pre-stored optimal coding mode as the optimal coding mode for each coding block that does not exceed the boundary of the image;

use, in response to a determination that any one of the first coding block, the second coding block, the third coding block, the fourth coding block, and the fifth coding block exceeds the boundary of the image, a direct current (DC) mode as the optimal coding mode for each coding block that exceeds the boundary of the image;

obtain, in response to a determination that the upper-layer coding block does not exceed the boundary of the image, a pre-stored optimal coding mode as the optimal coding mode for the upper-layer coding block; and use, in response to a determination that the upper-layer coding block exceeds a boundary of a largest intra-frame prediction coding block, the DC mode as the optimal coding mode for the upper-layer coding block.

14. The apparatus according to claim 11, wherein, to determine the optimal coding mode for the current coding block based on the candidate mode list and the neighboring mode list, the processing is configured to:

determine whether a candidate intra-frame prediction mode corresponding to an initial index value in the candidate mode list or a candidate intra-frame prediction mode corresponding to a second index value in the candidate mode list exists in the neighboring mode list;

update, in response to a determination that the candidate intra-frame prediction mode corresponding to the initial index value in the candidate mode list exists in the neighboring mode list, a value of N to a sum of the initial index value and a first preset value, and determine the optimal coding mode for the current coding block based on the updated value of N;

update, in response to a determination that the candidate intra-frame prediction mode corresponding to the initial index value in the candidate mode list does not exist in the neighboring mode list and that the candidate intra-frame prediction mode corresponding to the second index value in the candidate mode list exists in the neighboring mode list, a value of N to a sum of the second index value and a first preset value, and determine the optimal coding mode for the current coding block based on the updated value of N; and determine, in response to a determination that neither the candidate intra-frame prediction mode corresponding to the initial index value in the candidate mode list nor the candidate intra-frame prediction mode corresponding to the second index value in the candidate mode list exists in the neighboring mode list, the optimal coding mode for the current coding block based on the neighboring mode list and the candidate mode list.

15. The apparatus according to claim 14, wherein, to determine the optimal coding mode for the current coding block based on the updated value of N, the processing circuitry is configured to:

determine, in response to a determination that the updated value of N is equal to a second preset value, the candidate intra-frame prediction mode corresponding to the initial index value as the optimal coding mode for the current coding block; and determine, in response to a determination that the updated value of N is not equal to the second preset value, the optimal coding mode for the current coding block according to the candidate mode list and based on the updated value of N.

16. The apparatus according to claim 14, wherein, to determine the optimal coding mode for the current coding block based on the neighboring mode list and the candidate mode list, the processing circuitry is configured to:

determine, in response to a determination that an optimal coding mode corresponding to an initial index value in the neighboring mode list is the same as an optimal coding mode corresponding to a second index value in the neighboring mode list, a candidate index value of the optimal coding mode corresponding to the initial index value in the candidate mode list, and determine the optimal coding mode for the current coding block based on the candidate index value and the candidate mode list; and determine, in response to a determination that the optimal coding mode corresponding to the initial index value in the neighboring mode list is different from the optimal coding mode corresponding to the second index value in the neighboring mode list, the optimal coding mode for the current coding block based on the candidate mode list.

17. The apparatus according to claim 16, wherein, to determine the candidate index value of the optimal coding mode corresponding to the initial index value in the candidate mode list, the processing circuitry is configured to:

use, in response to a determination that the optimal coding mode corresponding to the initial index value in the neighboring mode list exists in the candidate mode list, an index value of the optimal coding mode corresponding to the initial index value in the candidate mode list as the candidate index value; and subtract, in response to a determination that the optimal coding mode corresponding to the initial index value in the neighboring mode list does not exist in the candidate mode list, a third preset value from the value of N to obtain the candidate index value.

18. A non-transitory computer-readable storage medium, storing computer-readable instructions, which, when executed by one or more processors, cause the one or more processors to perform an intra-frame prediction coding method comprising:

determining N candidate intra-frame prediction modes for a current coding block, and saving the N candidate intra-frame prediction modes to a candidate mode list, N being a positive integer;

obtaining optimal coding modes respectively corresponding to spatially neighboring coding blocks and an upper-layer coding block of the current coding block, and saving the optimal coding modes respectively corresponding to the spatially neighboring coding blocks and the upper-layer coding block to a neighboring mode list; and determining an optimal coding mode for the current coding block based on the candidate mode list and the neighboring mode list, wherein the spatially neighboring coding blocks comprise at least one of a first coding block adjacent to the current coding block and located at a left side of the current coding block, a second coding block adjacent to the current coding block and located at an upper side of the current coding block, a third coding block adjacent to the first coding block and located at an upper side of the first coding block, a fourth coding block adjacent to the first coding block and located at a lower side of the first coding block, and a fifth coding block adjacent to the second coding block and located at a right side of the second coding block, the determining the N candidate intra-frame prediction modes includes sorting predetermined rate-distortion optimization cost values respectively corresponding to a plurality of predetermined intra-frame prediction modes according to a first predetermined order, and using N top-ranking intra-frame prediction modes as the candidate intra-frame prediction modes for the current coding block, the saving the N candidate intra-frame prediction modes to the candidate mode list includes successively saving the N candidate intra-frame prediction modes to the candidate mode list according to the first predetermined order, and the saving the optimal coding modes respectively corresponding to the spatially neighboring coding blocks and the upper-layer coding block to the neighboring mode list includes successively saving the optimal coding mode for the at least one of the first coding block, the second coding block, the third coding block, the fourth coding block, and the fifth coding block and the optimal coding mode for the upper-layer coding block to the neighboring mode list according to a second predetermined order.

\* \* \* \* \*